March 31, 1970     L. AXTHAMMER     3,503,472

EXTENDABLE SUPPORT COLUMN

Filed Feb. 23, 1968

INVENTOR

Ludwig Axthammer

By: Low and Berman

Agents

United States Patent Office 3,503,472
Patented Mar. 31, 1970

3,503,472
EXTENDABLE SUPPORT COLUMN
Ludwig Axthammer, Garmisch-Partenkirchen, Germany, assignor to Fichtel & Sachs Aktiengesellschaft, Schweinfurt am Main, Germany
Filed Feb. 23, 1968, Ser. No. 707,846
Claims priority, application Germany, Mar. 22, 1967, F 51,907
Int. Cl. F16d 63/00, 57/00; F16j 15/00
U.S. Cl. 188—86    8 Claims

ABSTRACT OF THE DISCLOSURE

A hydropneumatic support column for a table top or the like has a cylinder, a piston in the cylinder, and a piston rod threadedly fastened to the piston and extending therefrom outwardly of the cylinder. The two compartments on either axial side of the piston communicate through a duct which is opened and closed when the piston rod is turned. A sealing ring in a circumferential groove of the piston is axially compressed, and thereby forced against the cylinder wall when the duct is closed, and is relieved of pressure when the duct is opened. When the duct is open, the effective length of the column can be adjusted.

Background of the invention

This invention relates to support columns of adjustable length, and particularly to extendable columns in which a piston is axially movable in a sealed, fluid-filled cylinder and axially divides the cylinder cavity into two compartments. A piston rod extends from the piston axially outward of the cylinder. The cylinder and piston rod are interposed between the object to be supported and the ground or floor. The axial length of the column can be changed only when the two compartments are connected through a valved by-pass duct.

Columns of the type described depend for operativeness on a tight seal between the piston and the inner wall of the cylinder. Even a slight leak between piston and cylinder wall causes the column to change in length under an applied load or under internal pressure whichever prevails.

It has therefore been common practice heretofore to provide the piston with at least one sealing ring of resilient material whose outer diameter in the relaxed condition is greater than the inner diameter of the cylinder so that the ring is strongly stressed in compression at all times. The resulting contact pressure between the ring and the cylinder wall causes substantial friction.

If the column is filled partly with liquid and partly with a gas under a pressure sufficiently higher than atmospheric pressure, the column expands spontaneously when relieved of an external load as soon as the bypass duct is opened. The internal gas pressure required depends to a significant extent on the friction between the piston and the cylinder wall. An interposed, strongly compressed sealing ring requires the column to be operated under a much higher gas pressure than would otherwise be needed, and all other features of the column must be adjusted to the higher operating pressure.

The hydropneumatic columns referred to are normally shortened by manually pushing the piston rod inward of the cylinder against the pressure of the gas. The force required for reducing the length of the column is greatly increased by high friction between a sealing ring on the piston and the inner cylinder wall, and is additionally increased by the need for operating at relatively high internal gas pressure as described in the preceding paragraph.

The useful life of a column of the type described is mainly determined by the wear of the sealing ring. Some such columns are lengthened and shortened relatively frequently, as in a table which may serve as a dining table when supported by fully extended columns, and as a coffee table when supported on the same columns reduced to their minimum length. The contact pressure between the sealing ring and the inner cylinder wall during their relative sliding movement is a major factor in determining the rate of wear of the ring. The greater the pressure, the shorter the useful life of the sealing ring under otherwise identical conditions.

The primary object of the invention is the provision of a column of the type described in which the contract pressure between a sealing member on the piston and the inner wall of the cylinder is insignificant while the length of the column is being changed, whereby the aforementioned shortcomings of the known extendable columns are avoided.

Summary of the invention

In one of its aspects, this invention resides mainly in an actuating mechanism which urges a sealing member mounted on the piston into engagement under pressure with the inner cylinder wall in response to the closing of the by-pass duct, and which responds to the opening of the duct for relieving this contact pressure.

When the sealing member is a ring, it is preferably arranged in a recess of the piston which is open toward the inner cylinder wall, and the actuating mechanism is effective in reducing the capacity or effective volume of the recess, thereby forcing the sealing member outward of the recess against the cylinder wall.

Other features, additional objects, and many of the attendant advantages of this invention will readily be appreciated as the same becomes better understood by reference to the following detailed description of preferred embodiments when considered in connection with the accompanying drawing.

DESCRIPTION OF THE PREFERRED EMBODIMENTS

Figure 1:
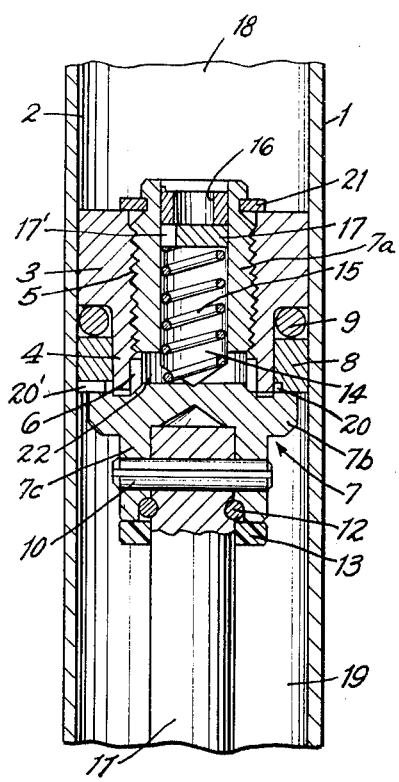
FIG. 1 shows a hydropneumatic support column of the invention in axial section, its by-pass duct being open.

Referring now to the drawing in detail, and initially to FIG. 1, there is seen a hollow cylinder 1 whose axial ends are sealed respectively by an imperforate plug 1a provided with a blind, radial, threaded bore 1b, and by an annular plug 1c slidably receiving a piston rod 11. The portion of the piston rod projecting from the plug 1c is provided with a radial threaded bore 11a. The bores 1b and 11a may be used for attaching the piston rod 11 to a base and the cylinder 1 to a table top which is to be supported at an adjustable height by the illustrated column.

A piston 3 attached to the inner end of the rod 11 divides the cavity of the cylinder 1 into a lower compartment 19 completely filled with liquid and an uuper compartment 18. An axial portion of the compartment 18 near the piston 3 is also filled with liquid, while the remainder of the compartment is occupied by a cushion of compressed air. The structure described so far is conventional, and its operation is known.

This invention is more specifically concerned with the sealing arrangement on the piston 3 which prevents leakage of fluids between the compartments 18, 19 in the operative position of the column, yet permits the piston to move quite freely in the cylinder when so desired.

Figure 2:
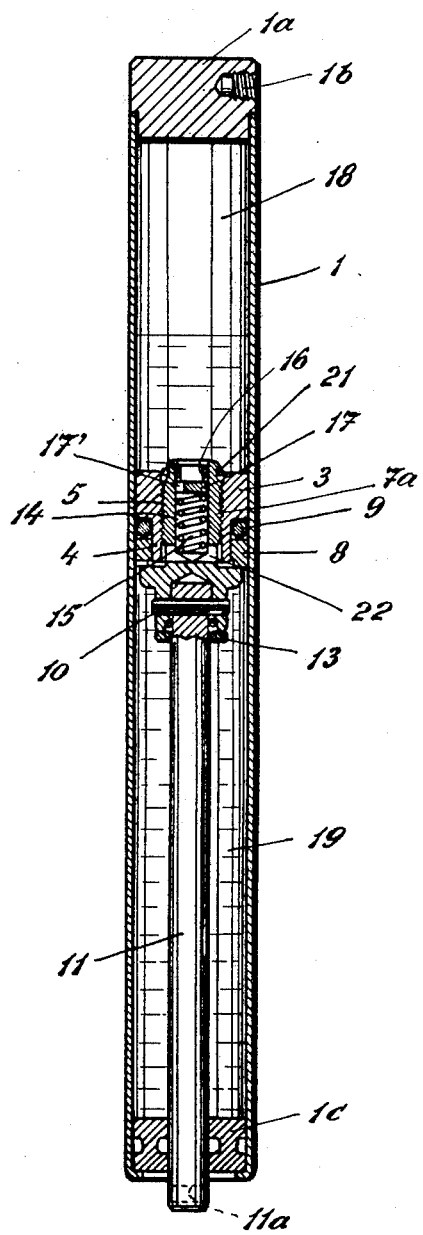
FIG. 2 shows a portion of the column of FIG. 1 including the by-pass duct which is shown to be closed by a valve arrangement.

As is better seen in FIG. 2, the piston 3 is tubular, Its main axial portion is only slightly smaller in diameter than the inner wall of the cylinder 1. A circumferential, axially open recess in one axial end of the piston 3 extends over more than two thirds of the radial thickness of the piston, leaving only a thin tubular portion 4. An O-ring 9 of yieldably resilient elastomeric material is received in the groove of the piston 3 whose radial depth is approximately identical with the relaxed diameter of the O-ring. When in the relaxed condition, the ring 9 engages the inner wall of the cylinder 1 only under very slight pressure if any.

The annular recess also receives a pressure ring 8 which projects axially downward beyond the tubular piston part 4 when the O-ring 8 is fully relaxed. The lower radial end face of the pressure ring 8 has an inner circumferential groove 20 from which radial grooves 20' lead outwardly through the ring 8.

An axially terminal tubular portion 7a of a valve member 7 is received in the axial bore of the piston 3. Engaged outer threads 5 on the tubular portion 7a of the valve member 7 and corresponding inner threads on the piston 3 permit the valve member to move axially relative to the piston when the valve member is turned. Rotation of the piston 3 about the cylinder axis is prevented by an axial rib 2 on the inner cylinder wall which engages conforming grooves in the piston 3 and in the pressure ring 8. A ring 21 on the valve member portion 7a limits the axial displacement of the same.

An axially central portion 7b of the valve member 7 provides an annular shoulder against which the pressure ring 8 normally abuts. The shoulder portion 7b is larger in cross section than the tubular portion 7a, but smaller than the cross section of the cylinder cavity. In the position of the apparatus shown in FIG. 2, the narrow radial end face of the piston portion 4 also abuts axially against the shoulder portion 7b. A radial passage 22 in the tubular valve member portion 7a near the shoulder portion 7b communicates with the axial bore 14 of the valve member portion 7a.

The outer end of the bore 14 is partly obstructed by a short cylindrical ring 16. A helical compression spring 15 normally holds a disc 17 against the ring 16. A notch 17' in the circumference of the disc 17 is almost axially aligned with the ring 16 so that the bore 14 communicates with the compartment 18 only through a channel whose flow section is a small fraction of that of the notch 17'.

The other terminal end portion 7c of the valve member 7 has a blind axial bore in which the inner end of the piston rod 11 is secured by a pin 10 passing radially through the valve member portion 7c and rod 11. The piston rod 11 is additionally secured to the valve member 7 by a ring 12 of spring wire which is received in opposite circumferential grooves of the piston rod 11 and of the inner wall of the valve member portion 7c. A flat rubber ring 13 on the annular end face of the valve member 7 about the piston rod 11 cushions the impact of the piston 3 and of the valve member 7 against the plug 1c when the piston rod 11 is withdrawn from the cylinder 1 as far as possible.

The afore-described column operates as follows:

As long as the device is in the condition shown in FIG. 2, the compartments 18, 19 are sealed from each other by the O-ring 9 which is forced radially outward of the recess in the piston 3 into pressure engagement with the inner wall of the cylinder 1 by the pressure ring 8, and also by the tubular portion 4 of the piston 3 and the shoulder portion 7b which abuttingly engage each other and thereby close a by-pass duct 6. The length of the column is fixed.

When the piston rod 11 is turned relative to the cylinder 1, the piston 3 and the valve member 7 move axially apart. The by-pass 6 is opened between the shoulder portion 7b and the narrow tubular portion 4 of the piston 3, so that liquid may flow between the compartments 18, 19 in sequence axially through the annular space between the portions 7c, 7b of the valve member 7 and the inner wall of the cylinder 1, radially inward through the radial grooves 20', the groove 20, the bore 14, and the notch 17'. The flow rate in a direction from the compartment 19 to the compartment 18 is mainly determined by the small throttling opening defined by the ring 16 and the disc 17.

When liquid flows in the opposite direction, from the compartment 18 to the compartment 19, the flowing liquid pushes the disc 17 away from the ring 16 against the restraint of the spring 15, and the liquid flow is unimpeded by the throttling arrangement.

Liquid flows from the compartment 18 to the compartment 19 when the outer load on the column is reduced until it is overcome by the gas pressure in the compartment 18. The throttling arrangement reduces the speed at which the piston rod 11 can move inward of the cylinder 1 when the column is under full load while the by-pass duct 6 is being opened.

The threaded bores 1b, 11a permit threaded radial bars to be inserted in the piston rod and in the cylinder without removing the load from the column, and the piston rod and cylinder may then be turned by means of the inserted radial bars.

As the valve member portion 7b moves axially away from the piston portion 4 while the by-pass duct 6 is being opened, the pressure ring 8 is expelled axially from the recess of the piston 3 by the axially expanding O-ring 9. The radial dimension of the latter is thereby reduced so that the ring engages the inner wall of the cylinder 1 only with minimal pressure while the piston 3 is moved axially in the cylinder during length adjustment of the column, thus reducing the force required for moving the piston. When the duct 6 is blocked, the O-ring is radially expanded by axial compression. It not only seals the clearance space between the piston 3 and the cylinder 1, but its frictional engagement with the cylinder wall contributes to the stability of the column and helps to maintain its length.

Because the rib 2 engages corresponding grooves in the piston 3 and the pressure ring 8, the walls of the recess enclosing the O-ring 9 do not move circumferentially relative to each other or relative to the O-ring. Wear of the ring in normal service is thus insignificant, and does not affect the useful life of the column between overhauls. In the absence of significant friction between the piston and the cylinder during length adjustment, the air pressure in the compartment 18 may be relatively low, and the lower operating pressure permits a reduction in the strength of all elements which bound the cylinder cavity. The column may be made lighter, and may be produced at lower cost.

An O-ring has been found most satisfactory for sealing the piston to the cylinder in the column of the invention, but the toroidal shape of the ring is not critical. Even flat rubber rings expand radially when subjected to axial compression, and may thus be employed. Many advantages of this invention are derived from the combination of an axially compressible and radially expandable sealing member with a cylinder whose compartments are filled partly with liquid and partly with a compressed inert gas, such as the air normally employed, or nitrogen which is preferred when the liquid used is subject to oxydation by atmospheric oxygen. The sealing arrangement, however, is also advantageous in columns which are filled entirely with a compressed gas or entirely with non-compressible liquid.

What is claimed is:

1. In an extendable column including a cylinder having an axis and an inner wall bounding a cavity in said cylinder, a piston axially movable in said cylinder and axially dividing said cavity into two compartments, sealing means on said piston interposed between said piston and said inner wall, a piston rod secured to said piston and axially extending from the same through one of said compartments and outward of said cavity, a by-pass duct connecting said compartments, fluid filling said compartments and said duct, valve means for opening and closing said duct and including a valve member, and valve actuating means outside said cavity for moving said valve member between a duct-opening and a duct-closing position, the improvement in the sealing means which comprises:

(a) a sealing member of yieldably resilient material; and (b) motion transmitting means connecting said sealing member to said valve actuating means and responsive to the closing of said duct by said valve means for urging said sealing member into sealing engagement under pressure with said inner wall, and responsive to the opening of said duct by said valve means for relieving said pressure, (1) said sealing member when engaging said inner wall, and said valve member in said duct-closing position jointly sealing said compartments and holding said piston stationary in said cavity.

2. In a column as set forth in claim 1, said fluid including a liquid filling one of said compartments and a portion of the other compartment axially adjacent said piston, and a gas under pressure higher than atmospheric pressure filling the remainder of said other compartment.

3. In a column as set forth in claim 1, said piston being formed with a recess open toward said wall and receiving said sealing member, and said motion transmitting means including means for reducing and increasing the capacity of said recess.

4. In a column as set forth in claim 3, said motion transmitting means including a pressure member axially movable on said piston inward and outward of said recess, and connecting means connecting said pressure member to said valve means for moving the pressure member inward of said recess in response to the closing of said duct by said valve means.

5. In a column as set forth in claim 4, said recess, said pressure member, and sealing member being annular, and a portion of said by-pass duct extending in said piston.

6. In a column as set forth in claim 4, said piston rod being axially movable relative to said piston, said valve means including a valve member mounted on said piston rod, respective portions of said valve member and of said piston jointly defining a portion of said duct when the duct is open, the duct being closed by relative axial movement of said piston and of said valve member, said connecting means moving said pressure member inward of said recess in response to said relative axial movement of the valve member and of said piston.

7. In a column as set forth in claim 6, means securing said piston against rotation about said axis, threads about said axis on said piston, and threads on said piston rod engaging the threads on said piston, whereby the piston and the piston rod move axially relative to each other when the piston rod is turned about said axis relative to said cylinder.

8. In a column as set forth in claim 6, said valve member being formed with a bore constituting a portion of said duct, and damping means in said bore normally restricting the flow section of said bore and selectively responsive to fluid flow through said bore in one direction for increasing said flow section.

References Cited

UNITED STATES PATENTS

| 1,754,764 | 4/1930 | Olson | 277—187 X |
| 2,042,443 | 5/1936 | Buckstone. | |
| 2,117,837 | 5/1938 | Casper | 188—88 |
| 2,678,114 | 5/1954 | De Koning et al. | 188—88 |
| 2,729,440 | 1/1956 | Wales. | |
| 2,752,149 | 6/1956 | Forcellini. | |
| 3,300,202 | 1/1967 | Vinton | 188—100 |
| 3,376,957 | 4/1968 | Baumgortner | 188—96 |

GEORGE E. A. HALVOSA, Primary Examiner

U.S. Cl. X.R.

188—96, 100; 248—354; 277—112, 187